United States Patent [19]

Dayen et al.

[11] Patent Number: 4,606,447
[45] Date of Patent: Aug. 19, 1986

[54] COUPLING CLUTCH AND A SELF-CONTAINED, NON-REMOVABLE GUARD

[75] Inventors: Leonid Dayen, Plymouth; Charles D. Raines, Blaine, both of Minn.

[73] Assignee: Horton Manufacturing Co., Inc., Minneapolis, Minn.

[21] Appl. No.: 630,374

[22] Filed: Jul. 12, 1984

[51] Int. Cl.[4] ..................... F16D 25/061; F16D 13/72
[52] U.S. Cl. .................. 192/85 C; 192/70.2; 192/113 A; 74/609
[58] Field of Search ................. 192/70.12, 70.19, 70.2, 192/70.28, 85 C, 85 CA, 113 A, 30 R; 416/247; 403/DIG. 7; 74/609

[56] References Cited

U.S. PATENT DOCUMENTS

| | | | |
|---|---|---|---|
| 1,707,843 | 4/1929 | Byerlein | 192/113 A |
| 1,851,700 | 3/1932 | Gibbs | 192/70.12 |
| 2,017,431 | 10/1935 | Anderson et al. | 416/247 |
| 2,028,500 | 1/1936 | Cook et al. | |
| 2,421,493 | 6/1947 | Gerst | |
| 2,587,230 | 2/1952 | Schaad | 192/59 X |
| 3,282,385 | 11/1966 | Snyder | |
| 3,444,972 | 5/1969 | Carstensen et al. | |
| 3,474,887 | 10/1969 | Hansen | 74/107 X |
| 3,480,123 | 11/1969 | Anderson et al. | |
| 3,554,341 | 1/1971 | Anderson | 192/70.2 |
| 3,667,581 | 6/1972 | Hanks | 192/113 A X |
| 3,760,916 | 9/1973 | Hanks et al. | 192/85 CA X |
| 3,770,087 | 11/1973 | Jaeschke | 192/18 B |
| 4,160,498 | 7/1979 | Newton et al. | 192/84 C |
| 4,226,095 | 10/1980 | Loken | 192/70.2 X |

FOREIGN PATENT DOCUMENTS

| | | |
|---|---|---|
| 1600178 | 3/1970 | Fed. Rep. of Germany . |
| 2118762 | 7/1972 | France . |
| 128049 | 4/1950 | Sweden ..................... 403/DIG. 7 |
| 868197 | 5/1961 | United Kingdom . |

OTHER PUBLICATIONS

1978 Catalog, Warner Electric Brake & Clutch Co., Beloit, Wisconsin 12th Edition, Jan. 1978, pp. B-166 through B-173.

Primary Examiner—Rodney H. Bonck
Assistant Examiner—Richard M. Lorence
Attorney, Agent, or Firm—Peterson, Wicks, Nemer & Kamrath

[57] ABSTRACT

A coupling clutch according to the teachings of the present invention is shown in its most preferred form as including first and second hubs having first and second splined friction discs received thereon. The first friction disc is biased away from the second friction disc and is movable towards the second friction disc by a piston reciprocally mounted to a housing and rotatably mounted to the first friction disc by a bearing mounted therebetween. The second friction disc is substantially prevented from sliding on the splines with the second hub. The splines between the second friction disc and the second hub allow the second friction disc to cant to compensate for axial angular misalignment of the first and second hubs. The guard is shown according to the teachings of the present invention in its most preferred form as including a plurality of ring members held in a spaced relation by bars. The ring members have a shape complementary to and for receipt on a first shell of a housing. The bars are received within apertures formed in the first shell and are captured therein when the second shell is secured to the first shell. The guard is then self-contained, self-aligned, and cannot be removed without disassembly of the housing.

20 Claims, 3 Drawing Figures

COUPLING CLUTCH AND A SELF-CONTAINED, NON-REMOVABLE GUARD

The present invention relates generally to rotational control apparatuses and particularly to coupling clutches and to guards for rotational control apparatuses, and more specifically to self-contained, non-removable guards.

It is often desireable to couple first and second mutually rotating parts such as shafts and to controllably rotatably relate them together. Coupling clutches can be utilized in these situations. However, coupling clutches suffered from problems resulting from the horizontal and angular misalignment of the shafts.

Rotational control apparatuses require openings in the housing for air flow for cooling or other purposes. However, due to OSHA standards for preventing placement of fingers through the cooling openings and for other and like reasons, problems resulted from providing air cooling entrances in an economical manner while meeting OSHA standards and other design requirements.

SUMMARY

The present invention solves these and other problems by providing in its most preferred form a coupling clutch including first and second hubs for receipt of shafts. Further provided are first and second friction discs for slideable receipt on the first and second hubs, respectively. The first friction disc is biased in a first axial direction and is selectively movable in the opposite axial direction for the selective engagement of the first and second friction discs. Although slideably mounted, the second friction disc is substantially prevented from sliding on the second hub for allowing canting of the second friction disc with respect to the second hub to take up angular misalignment of the first and second shafts.

The present invention also solves these and other problems by providing in its most preferred form a guard for a housing. In its most preferred form, the guard includes a guard appliance having an inner circumference having a shape complementary to and for receipt on an outer perimeter of an annular flange of a first shell of a housing. The guard further includes retainers secured to the inner circumference of the guard appliance and for receipt within openings formed in the annular flange of the first shell and are captured therein when the first shell is secured to a second shell.

It is thus an object of the present invention to provide a novel coupling clutch.

It is thus an object of the present invention to provide a novel guard.

It is further an object of the present invention to provide such a novel guard which is non-removable without disassembly of the unit housing.

It is further an object of the present invention to provide such a novel guard which is self-aligning.

It is further an object of the present invention to provide such a novel guard which allows simplified housing casting while providing required opening restrictions.

It is further an object of the present invention to provide such a novel guard which can be easily and rapidly assembled to the unit housing.

It is further an object of the present invention to provide such a novel guard which can be easily manufactured at low cost.

It is further an object of the present invention to provide such a novel guard which is self-contained.

It is further an object of the present invention to provide such a novel coupling clutch which compensates for angular misalignment of the coupled shafts.

It is further an object of the present invention to provide such a novel coupling clutch which compensates for horizontal misalignment of the coupled shafts.

It is further an object of the present invention to provide such a novel coupling clutch which utilizes similar parts created from the same casting and machined to their final form.

It is further an object of the present invention to provide such a novel coupling clutch which provides selfbalancing of the frictional engagement surfaces.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
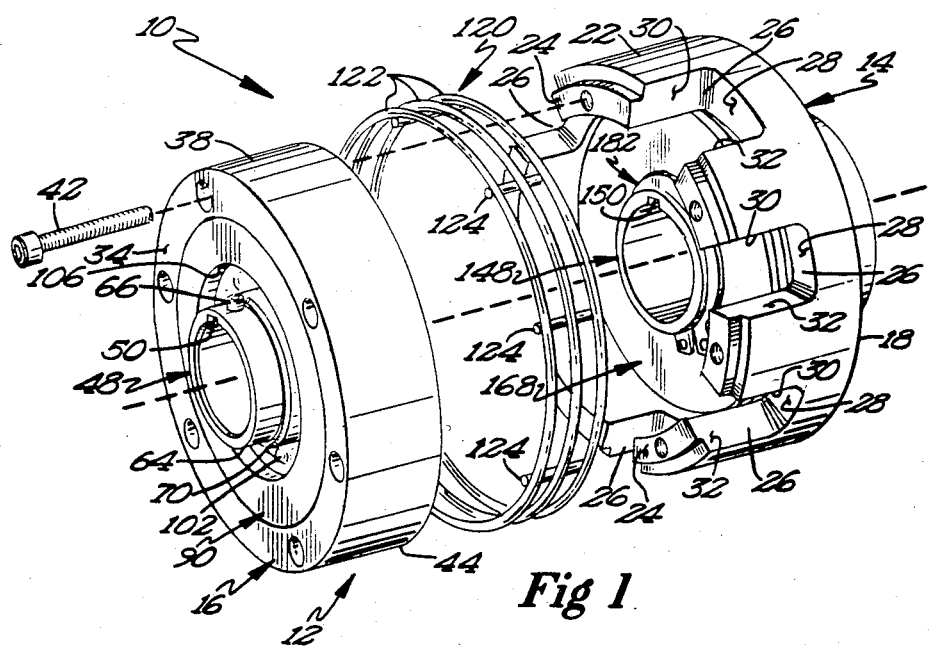
FIG. 1 shows an exploded, perspective view of a coupling clutch having a self-contained, non-removable guard constructed according to the teachings of the present invention.
Figure 3:
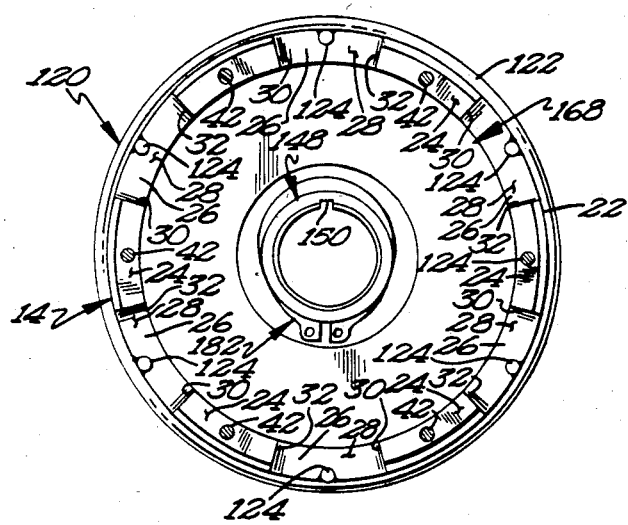
FIG. 3 shows a cross-sectional view of the fully assembled clutch and guard of FIG. 1 according to section line 3—3 of FIG. 2.
Figure 2:
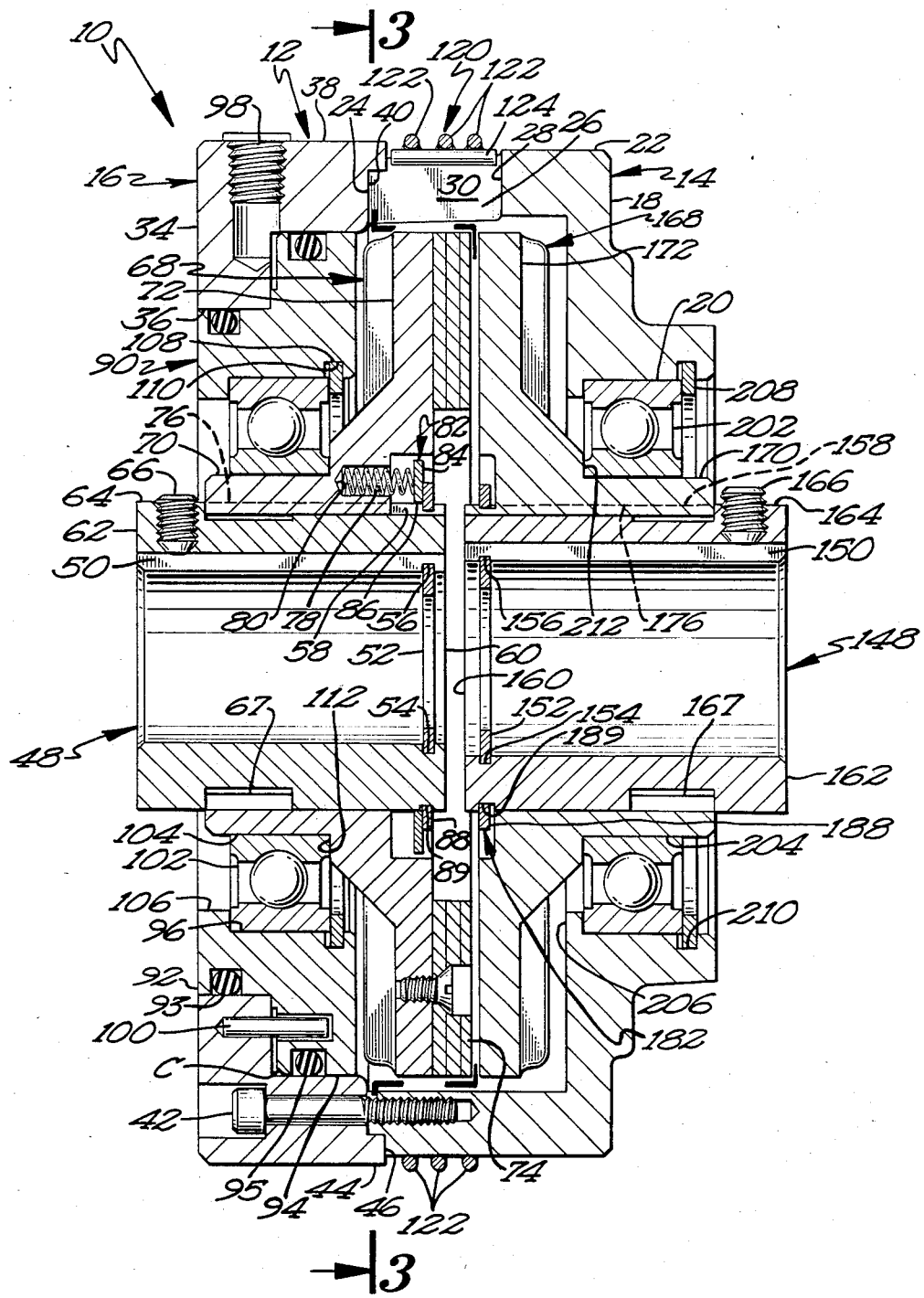
FIG. 2 shows a full cross-sectional view of the fully assembled clutch and guard of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

A coupling clutch according to the teachings of the present invention is shown in the drawings and is generally designated 10. Clutch 10 includes a stationary housing 12 including in its most preferred form a first shell 14 and a second shell 16. First shell 14 includes a generally annular portion 18 having an inner edge terminating in a bearing mounting surface 20 and an outer edge terminating in a right angular or axially extending flange 22. Flange 22 terminates in an annular, abutment edge 24. Openings 26 are formed in flange 22 extending inwardly from edge 24 and terminating in a spaced relation from the outer edge of annular portion 18. In its most preferred form, openings 26 are generally U-shaped extending from edge 24 terminating in edge 28 which is parallel to edge 24 and having side edges 30 and 32 extending generally perpendicular to edges 24.

Second shell 16 includes a generally annular portion 34 having an inner cylindrical edge 36 and an outer edge terminating in a right angular and axially extending flange 38. Flange 38 terminates in an annular edge 40. Housing 12 is formed by securing shells 14 and 16 together with edges 24 and 40 of flanges 22 and 38, respectively, abutting together. In its most preferred form, shells 14 and 16 are secured by bolts 42 extending through flange 38 of shell 16 and threadably received in flange 22 of shell 14 between openings 26. In its most preferred form, the outer surface of flange 38 has a slightly larger diameter than the outer surface of flange 22. Further, in its most preferred form, edge 40 includes an axially extending shoulder 44 and edge 24 includes a removed portion 46 complementary to and for receipt of shoulder 44. Thus, portion 46 and shoulder 44 provide an interlocking relation between shells 14 and 16.

Clutch 10 further includes a hub 48 for receiving a shaft not specifically shown. Suitable keyway means 50 can further be provided for preventing relative rotation between the shaft and hub 48. A retainer ring 52 such as a snap ring can further be provided in a radially extending cavity 54 for preventing the shaft from going in too far. Keyway 50 can further include a radially extending cavity 56 formed on the outside surface for receipt of retainer ring 52 for holding keyway 50 in the desired position and preventing axial movement.

Splines 58 are formed on the outside surface of hub 48 extending from its first, axially inward end 60 to a point spaced from its second, axially outward end 62. An annular shoulder 64 is formed adjacent the second, axially outward end 62 having a radial extent equal to that of splines 58. In its most preferred form, set screws 66 are provided in shoulder 64 which abut with the shaft and the keyway 50 for removeably securing the shaft in hub 48. In its most preferred form, hub 48 includes an annular groove 67 formed in the outer circumference of hub 48 and extending axially from shoulder 64 to the axial extent of splines 58.

Clutch 10 further includes a driven friction disc 68 including a hub portion 70 and a radially extending surface 72. In its most preferred form, a friction ring 74 is mounted to surface 72 of friction disc 68. Hub portion 70 includes splines 76 complementary to and for sliding receipt on splines 58 of hub 48.

Friction disc 68 is biased on splines 76 and 58 towards shoulder 64 by springs 78 received in axially extending apertures 80 formed in friction disc 68 and which abut with a retaining member 82. Member 82 is shown in its most preferred form as a first retaining ring 84 having an inner splined edge 86 for sliding receipt on splines 58 of hub 48 which abuts with a second retaining ring 88 received in a radially extending cavity 89 formed in the outside surface of hub 48 for preventing movement of ring 84 beyond the end 60 of hub 48.

For purposes of sliding friction disc 68 on splines 58 against the bias of springs 78, a piston 90 is further provided slideably mounted to housing 12. In its most preferred form, piston 90 is annular having an L-shaped body portion and includes a first axially extending, annular leg 92 and a second radially extending, annular leg 94. A bearing mount 96 is formed on the radially inward surface of leg 92. Edge 36 of shell 16 abuts with and slides along the radially outward surface of leg 92. Suitable sealing means 93 can be provided between edge 36 and the radially outward surface of leg 92 such as an O-ring seated on the radially outward surface of leg 92. The free end of leg 94 abuts with and slides along flange 38 of shell 16. Suitable sealing means 95 can be provided between the free end of leg 94 and flange 38 such as an O-ring seated in the free end of leg 94. Thus, a cylinder C is formed by and between annular portion 34 and flange 38 of shell 16 and legs 92 and 94 of piston 90. Suitable provisions 98 are provided for supplying fluid pressure to cylinder C. Torque pins 100 can be provided extending between annular portion 34 and leg 94 for purposes of slideably mounting piston 90 with respect to shell 16 of housing 12.

Piston 90 is rotatably mounted by a bearing 102 located between mount 96 of piston 90 and bearing mount 104 formed on friction disc 68. In its most preferred form, the outer race of bearing 102 is captured between a shoulder 106 extending radially from mount 96 and a retaining ring 108 received in a cavity 110 extending radially into mount 96. The inner race of bearing 102 abuts with a shoulder 112 extending radially outward from mount 104 of friction disc 68.

Thus, it should be appreciated that bearing 102 rotatably mounts shell 16 of housing 12 and piston 90 with respect to hub 48 and friction disc 68. Further, it should be noted that piston 90 and friction disc 68 are slideable with respect to shell 16 of housing 12 and with respect to hub 48. Specifically, if fluid pressure is introduced through provision 98 into cylinder C, piston 90 slides on shell 16 of housing 12. Due to their common connection with bearing 102, friction disc 68 slides along hub 48 by splines 76 and 58 with piston 90 movement. Thus, piston 90 and friction disc 68 are axially interrelated, i.e., maintain the same axial positions with respect to each other, but are rotatably independent from each other.

Clutch 10 further includes a hub 148 for receiving a shaft not specifically shown. Suitable keyway means 150 can further be provided for preventing relative rotation between the shaft and hub 148. A retainer ring 152 such as a snap ring can further be provided in a radially extending cavity 154 for preventing the shaft from going in too far. Keyway 150 can further include a radially extending cavity 156 formed on the outside surface for receipt of retainer ring 152 for holding keyway 150 in the desired position and preventing axial movement.

Splines 158 are formed on the outside surface of hub 148 extending from its first, axially inward end 160 to a point spaced from its second, axially outward end 162. An annular shoulder 164 is formed adjacent the second, axially outward end 162 having a radial extent equal to that of spines 158. In its most preferred form, set screws 166 are provided in shoulder 164 which abut with the shaft and the keyway 150 for removeably securing the shaft in hub 148. In its most preferred form, hub 148 includes an annular groove 167 formed in the outer circumference of hub 148 and extending axially from shoulder 164 to the axial extent of splines 158.

Clutch 10 further includes a drive friction disc 168 including a hub portion 170 and a radially extending surface 172. In its most preferred form, surface 172 of friction disc 168 frictionally engages with friction ring 74 of friction disc 68. Hub portion 170 includes splines 176 complementary to and for sliding receipt on splines 158 of hub 148.

Friction disc 168 is prevented from moving in a first axial direction by shoulder 164 and is prevented from moving in the opposite axial direction by a retaining member 182. Member 182 is shown in its most preferred form as a retaining ring 188 received in a radially extending cavity 189 formed in the outside surface of hub 148. Thus, shoulder 164 and retaining ring 188 substantially prevent slideable movement of friction disc 168 on hub 148.

Shell section 14 of housing 12 is rotatably mounted by a bearing 202 located between mount 20 of section 14 and bearing mount 204 formed on friction disc 168. In its most preferred form, the outer race of bearing 202 is captured between a shoulder 206 extending radially from mount 20 and a retaining ring 208 received in a cavity 210 extending radially into mount 20. The inner race of bearing 202 abuts with a shoulder 212 extending radially outward from mount 204 of friction disc 168. Thus, it should be appreciated that bearing 202 rotatably mounts shell 14 of housing 12 with respect to hub 148 and friction disc 168.

It should then be noted that when it is necessary to couple first and second shafts as in the present invention, the shaft axes are often horizontally misaligned as well as angularly misaligned. Problems arising from misalignment of the shafts are especially prone in rotational control apparatuses which couple first and second shafts and where independently rotating parts connected to the respective shafts frictionally engage or mate with each other to rotationally control or relate the shafts with respect to each other.

The present invention solves this problem by providing a splined connection between friction disc 168 and hub 148 even though sliding of friction disc 168 is undesireable and is substantially prevented from sliding by shoulder 164 and retaining member 182. Specifically, the splined connection between friction disc 168 and hub 148 allows the friction disc 168 to cant in regard to hub 148 due to the float or play allowed by splines 158 and 176. Particularly, when fluid pressure is introduced into cylinder C through provisions 98, piston 90 moves in the axial direction towards friction disc 168 against the bias of springs 78 moving friction ring 74 of friction disc 68 to engage with friction disc 168. However, if the shafts received within hubs 48 and 148 are angularly misaligned, friction ring 74 will engage friction disc 168 at an angle thereto making a single point contact rather than around the entire circumference of friction ring 74. Thus, the friction engagement surface is greatly reduced resulting in disadvantageous operation including greater slippage causing higher heat generation, excessive wear of friction ring 74 and friction discs 68 and 168, and reduced torque transfer. In the present invention if friction ring 74 makes a single point contact with friction disc 168, friction disc 168 will cant to mate with friction ring 74 around its entire circumference due to the splined connection of friction disc 168. Utilizing the present invention, in the range of three-fourths of a degree angular misalignment can be taken up or compensated for by clutch 10 according to the teachings of the present invention.

Additionally, according to the teachings of the present invention, utilizing air or other fluid to move the piston, rather than electricity, also compensates for shaft axial misalignment. Specifically, the sealing members shown in its most preferred form as O-rings 93 and 95 of piston 90 allow slop in O-rings 93 and 95 and the manufacturing tolerances allowed for shell 16 of housing 12 and piston 90. Thus, if friction ring 74 makes a single point contact with friction disc 168 due to the angular misalignment of the shafts within hubs 48 and 148, friction disc 68 upon which friction ring 74 is mounted may cant on hub 48 to allow mating of friction ring 74 and friction disc 168 around its entire circumference. Therefore, due to the culminating effect of the splined connection of friction disc 168 and the use of air to axially move piston 90, larger angular misalignment of the shafts within hubs 48 and 148 can be compensated for utilizing the teachings of the present invention.

Furthermore, the slop in O-rings 93 and 95 and the manufacturing tolerances allowed for shell 16 of housing 12 and piston 90 also compensate for axial or horizontal misalignment. Specifically, if the shafts are not axially aligned, friction discs 68 and 168 will not rotate about the same axis resulting in an out of balance or non-concentric engagement of friction ring 74 with friction disc 168. Utilizing the present invention, friction disc 68 upon which friction ring 74 is mounted will self-align with respect to friction disc 168 due to the slop and tolerances of piston 90, shell 16, and O-rings 93 and 95 such that a concentric, balanced frictional engagement occurs between friction ring 74 and friction disc 168. In the preferred embodiment, friction disc 68 will move radially in the range of 0.005 inch in providing for frictionally engaging self-alignment in the case of shaft axial misalignment.

It should also be noted that clutch 10 also has an advantageous construction. Specifically, many similar parts are utilized such that the same casting can be utilized for the similar parts and then the parts can be machined to their final form thus greatly reducing initial start-up costs, casting costs, and overhead. For example, friction discs 68 and 168 can be cast from the same mold and apertures 80 drilled for friction disc 68.

Clutch 10 according to the preferred embodiment of the present invention further includes a guard 120. Guard 120 includes a guard appliance shown in its most preferred form as a plurality of circumferential ring members 122 having a diameter generally equal to but slightly larger than the outside surface of flange 22 and for sliding receipt on the outside surface of flange 22. Ring members 122 are held in spaced relation by axially extending, cross braces or bars 124 located interiorly of rings 122 at the circumferential spacing of and for receipt within openings 26 of flange 22 of shell 14 of housing 12. In its most preferred form, bars 124 have an axial length generally equal to the length of openings 26 between edges 24 and 28.

During assembly of clutch 10 and before shells 14 and 16 are put together, guard 120 is placed on shell 14. Specifically, ring members 122 are placed on flange 22 of shell 14 and bars 124 are located within openings 26 until its end abuts with edge 28. It can then be realized that guard 120 is self-aligning due to the positioning of bars 124 with openings 26 and guarantees a unique rotational relation of guard 120 with respect to shell 14. Shell 16 can be positioned and secured to shell 14 by bolts 42. It can then be realized that the opposite end of bars 124 will then abut with shoulder 44 of edge 40 of shell 16. It can then be appreciated that ring members 122 and guard 120 are held and retained in position on shell 14 and housing 12 by the abutting relation of bars 124 with edge 28 and shoulder 44.

It can then be appreciated that guard 120 of the present invention includes several other unique, advantageous features. Specifically, guard 120 is self-maintained or self-contained in that no assembly of guard 120 is required during assembly of rotational control apparatus 10, but rather guard 120, as a unitary member, is simply slipped in place on shell 14 during assembly of rotational control apparatus 10. Additionally, no tools are required during placement of guard 120 on rotational control apparatus 10. Further, guard 120 cannot be removed without disassembly of shells 14 and 16 of apparatus 10.

It can further be appreciated that rotational control apparatus such as clutch 10 of the present invention require openings in housing 12 for air flow for cooling and other purposes. However, OSHA standards require that the distance of the housing openings be less than one-fourth of an inch when rotating parts are located within the housing as in the case of rotational control apparatus. Guard 120 meets this OSHA standard and allows openings 26 of housing 12 to be of a large size. Particularly, if housing 12 were itself cast to include openings that met the OSHA standards, the expenses involved would be great. However, using guard 120, which is non-removeable without the disassembly of housing 12, allows openings 26 to be made of a large size, reducing the casting costs of housing 12 while utilizing guard 120, which can be manufactured and assembled on clutch 10 at a relatively low cost, to meet the OSHA standard.

Now that the basic teachings of the present invention have been explained, many extensions and variations will be obvious to one having skill in the art. For example, in its most preferred form, disc 168 is the drive or input of clutch 10 because greater heat distribution is allowed through shell section 14 of housing 12 than through shell section 16 of housing 12. However, if desired, disc 168 can be operated as the driven disc and disc 68 can be operated as the drive disc according to the teachings of the present invention.

It should be appreciated that the teachings of the present invention can be utilized in combination with other rotational control apparatuses. For example, provisions can be utilized to brake hub 48 when friction ring 74 is not in a frictionally engaging relation with friction disc 168. Such further combinations may be obvious to persons skilled in the art after the teachings of the present invention are known.

Likewise, it can be appreciated that clutch 10 can be utilized to couple shafts having different diameters as shown in the drawings, with either the drive or driven shaft being of a smaller diameter or to couple shafts having the same diameters.

Additionally, although guard 120 is described in use with coupling clutch 10, guard 120 can be utilized with other types of rotational control apparatuses or in other environments according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Coupling clutch comprising, in combination: a first hub for receipt of a first shaft in a non-rotatable condition; a second hub for receipt of a second shaft in a non-rotatable condition; a first disc; means for slideably mounting the first disc on the first hub; means for biasing the first disc in a first axial direction towards a first axial position on the first hub; a second disc, with the second disc being selectively engageable with the first disc to rotatably relate the first disc and the second disc; means for slideably mounting the second disc on the second hub; a first shell section; a second shell section; means for interconnecting the first shell section to the second shell section to form a clutch housing; means for rotatably mounting the first shell section on the second disc; with the first shell section including an axially extending annular flange terminating in an abutment edge, with the abutment edge abutting with the second shell section in an interconnected relation, with the annular flange having an outer diameter; circumferentially spaced cooling air openings formed in the housing extending axially from the abutment edge of the flange; a piston reciprocally received in the housing; a cylinder for receipt of fluid pressure for reciprocating the piston within the housing in the opposite axial direction towards a second axial position and wherein the first disc engages with the second disc; means for sealing between the piston and the housing; means for axially relating the piston and the first disc and for rotatably mounting the piston with respect to the first disc wherein the tolerances of the piston and the cylinder and the sealing means allow the canting of the first disc with respect to the first hub to take up horizontal misalignment of the first and second shafts; means for substantially preventing slideable movement of the second disc with respect to the second hub and for allowing the canting of the second disc with respect to the second hub to take up angular misalignment of the first and second shafts; and guard means for allowing entry of cooling air into the cooling air openings, for preventing entry of a finger into the cooling air openings, and for preventing removal of the guard means without the disassembly of the first and second shell sections from each other, with the guard means comprising, in combination: a plurality of circumferential ring members having a shape and an inner diameter substantially equal to but slightly larger than the outer diameter of the annular flange and for receipt thereon; and cross braces for holding the ring members in a spaced relation, with the cross braces being secured on the inner diameter of the ring members in circumferentially spaced relation corresponding to and for receipt within the cooling air openings.

2. The coupling clutch of claim 1 wherein the axially relating and rotatably mounting means comprises a bearing located between the first disc and the piston.

3. The coupling clutch of claim 1 further comprising, in combination: means for preventing the first shaft from extending too far longitudinally within the first hub and abutting with the second hub; and means for preventing the second shaft from extending too far longitudinally within the second hub and abutting with the first hub.

4. The coupling clutch of claim 3 wherein the length of the cross braces is generally equal to the axial extent of the cooling air openings, wherein the cross braces are captured between the second shell section and the axial extent of the cooling air openings.

5. Coupling clutch comprising, in combination: a first hub for receipt of a first shaft in a non-rotatable condition; a second hub for receipt of a second shaft in a non-rotatable condition; a first disc; means for slideably mounting the first disc on the first hub; means for biasing the first disc in a first axial direction towards a first axial position on the first hub; means for moving the first disc in the opposite axial direction towards a second axial position; a second disc, with the second disc being selectively engageable with the first disc to rotatably relate the first disc and the second disc; means for slideably mounting the second disc on the second hub; and means for substantially preventing slideable movement of the second disc with respect to the second hub and for allowing the canting of the second disc with respect to the seoond hub to take up angular misalignment of the first and second shafts.

6. The coupling clutch of claim 5 further comprising, in combination: a housing; and wherein the moving means comprises, in combination: a piston reciprocally received in the housing; a cylinder for receipt of fluid pressure for reciprocating the piston within the housing; and means for axially relating the piston and the first disc.

7. The coupling clutch of claim 6 wherein the housing is stationary; and wherein the means for axially relating the piston and the first disc comprises means for rotatably mounting the piston with respect to the first disc.

8. The coupling clutch of claim 7 wherein the axially relating and rotatably mounting means comprises a bearing located between the first interface disc and the piston.

9. The coupling clutch of claim 6 further comprising, in combination: means for sealing between the piston and the housing; and wherein the first disc engages with the second disc in its second axial position; wherein the tolerances of the piston and the cylinder and the sealing means allow the canting of the first disc with respect to the first hub to take up horizontal misalignment of the first and second shafts.

10. The coupling clutch of claim 5 further comprising, in combination: a first shell section; a second shell section; means for interconnecting the first shell section to the second shell section to form a clutch housing; means for rotatably mounting the first shell section on the second disc; means for rotatably mounting the second shell section on the first disc; with the first shell section including an axially extending annular flange terminating in an abutment edge, with the abutment edge abutting with the second shell section in an interconnected relation, with the annular flange having an outer diameter; circumferentially spaced cooling air openings formed in the housing extending axially from the abutment edge of the flange; guard means for allowing entry of cooling air into the cooling air openings, for preventing entry of a finger into the cooling air openings, and for preventing removal of the guards means without the disassembly of the first and second shell sections from each other, with the guard means comprising, in combination: a plurality of circumferential ring members having a shape and an inner diameter substantially equal to but slightly larger than the outer diameter of the annular flange and for receipt thereon; and cross braces for holding the ring members in a spaced relation, with the cross braces being secured on the inner diameter of the ring members in a circumferentially spaced relation corresponding to and for receipt within the cooling air openings.

11. The coupling clutch of claim 10 wherein the length of the cross braces is generally equal to the axial extent of the cooling air openings wherein the cross braces are captured between the second shell section and the axial extent of the cooling air openings.

12. The coupling clutch of claim 5 further comprising, in combination: means for preventing the first shaft from extending too far longitudinally within the first hub and abutting with the second hub; and means for preventing the second shaft from extending too far longitudinally within the second hub and abutting with the first hub.

13. The coupling clutch of claim 12 wherein the preventing means comprises, in combination: an annular cavity formed within the hub; and a snap ring received in the annular cavity for abutting with the shaft received within the hub.

14. The coupling clutch of claim 5 wherein the first disc comprises a friction disc and wherein the second disc comprises a friction disc.

15. Guard for a housing, with the housing comprising, in combination: a first shell and a second shell, with the first shell having an annular flange having an outer perimeter having a diameter and an abutment edge; openings formed in the annular flange extending axially from the abutment edge; means for securing the first shell to the second shell with the second shell abutting with the abutment edge of the first shell; with the guard comprising, in combination: a self-contained guard appliance having an inner circumference having a shape complementary to and for receipt on the outer perimeter of the annular flange, with the inner circumference of the guard appliance having a diameter generally equal to but slightly larger than the outer diameter of the annular flange, with the guard appliance having openings therein having a size smaller than the openings of the annular flange and allowing air to pass therethrough but preventing a finger or like object from being extended therethrough; and means for retaining the guard appliance on the annular flange comprising cross braces secured to the inner circumference of the guard appliance at locations corresponding to and for receipt and capture within the openings of the annular flange when the second shell is secured to the first shell, with the cross braces being located at a diameter generally equal to but smaller than the diameter of the annular flange.

16. The guard of claim 15 wherein the cross braces have a length generally equal to the axial extent of the openings in the annular flange to thereby substantially prevent axial movement of the cross braces and the guard appliance to which they are secured in the flange openings when the first shell is secured to the second shell.

17. The guard of claim 15 wherein the guard appliance comprises, in combination: a plurality of ring members having a diameter generally equal to but slightly larger than the diameter of the outer perimeter of the annular flange, with the ring members being in a spaced relation.

18. The guard of claim 17 wherein the cross braces are bars and wherein the bars hold the ring members in a spaced relation.

19. The guard of claim 17 wherein the ring members are in a parallel relation.

20. The housing of claim 15 wherein the second shell includes an axially extending shoulder and wherein the abutment edge of the annular flange of the first shell includes a removed portion having a shape complementary to and for receipt of the axially extending shoulder to provide an interlocking relation between the first and second shells when the first shell is secured to the second shell of the housing.

* * * * *